United States Patent
Frid et al.

(10) Patent No.: US 9,496,726 B2
(45) Date of Patent: Nov. 15, 2016

(54) MULTIPORT USB CHARGER

(71) Applicant: Leviton Manufacturing Co., Inc., Melville, NY (US)

(72) Inventors: Eugene Frid, Great Neck, NY (US); Michael Ostrovsky, Brooklyn, NY (US)

(73) Assignee: Leviton Manufacturing Co., Inc., Melville, NY (US)

( * ) Notice: Subject to any disclaimer, the term of this patent is extended or adjusted under 35 U.S.C. 154(b) by 239 days.

(21) Appl. No.: 14/275,380

(22) Filed: May 12, 2014

(65) Prior Publication Data

US 2015/0035476 A1 Feb. 5, 2015

Related U.S. Application Data

(60) Provisional application No. 61/860,646, filed on Jul. 31, 2013.

(51) Int. Cl.
  *H02J 7/00* (2006.01)
  *H02J 7/04* (2006.01)
  *H01R 13/516* (2006.01)
  *H01R 13/66* (2006.01)
  *H01R 25/00* (2006.01)

(52) U.S. Cl.
  CPC ............ *H02J 7/0021* (2013.01); *H01R 13/516* (2013.01); *H01R 13/6666* (2013.01); *H01R 13/6675* (2013.01); *H01R 13/6683* (2013.01); *H01R 25/006* (2013.01); *H02J 7/007* (2013.01); *H02J 2007/0062* (2013.01)

(58) Field of Classification Search
  USPC ........ 320/106, 107, 111, 112, 113, 114, 115, 320/110, 132, 135, 134, 137, 138, 141; 307/11, 151, 80; 363/146; 439/535, 439/536, 651, 956
  See application file for complete search history.

(56) References Cited

U.S. PATENT DOCUMENTS 6,512,682 B2   1/2003   Coehn et al.
6,614,206 B1 *  9/2003   Wong .................... G06F 1/1632
                                                    320/135

(Continued)

FOREIGN PATENT DOCUMENTS

WO   WO 2012/068635 A1   5/2012

*Primary Examiner* — Alexis A Boateng
(74) *Attorney, Agent, or Firm* — Carter, DeLuca, Farrell & Schmidt, LLP (57) ABSTRACT

A universal serial bus charging device for charging connected electronic devices is presented. The universal serial bus includes a microprocessor and a power supply configured to output a total charging current. The universal serial bus charging device further includes a plurality of low voltage ports in communication with the microprocessor and electrically coupled to the power supply. Each of the plurality of low voltage ports are capable of connecting with the electronic devices and providing the electronic devices a device charging current. The microprocessor is configured to enumerate the connected electronic devices and communicate to each of the enumerated electronic devices the device charging current available through its respective low voltage port connection. The available device charging current for each enumerated electronic device is determined by the microprocessor as a function of a total charging current and the enumerated electronic devices.

21 Claims, 7 Drawing Sheets

(56) References Cited

U.S. PATENT DOCUMENTS

| | | | |
|---|---|---|---|
| 6,936,936 B2 * | 8/2005 | Fischer | H01R 13/6675 307/151 |
| 7,170,259 B2 | 1/2007 | Veselic | |
| 7,212,420 B2 * | 5/2007 | Liao | H01R 13/6675 363/146 |
| 7,239,111 B2 | 7/2007 | Fischer et al. | |
| 7,242,111 B2 | 7/2007 | Menas et al. | |
| 7,285,874 B2 | 10/2007 | Menas et al. | |
| 7,358,703 B2 | 4/2008 | Veselic | |
| 7,453,233 B2 | 11/2008 | Fischer et al. | |
| 7,485,986 B2 | 2/2009 | Menas et al. | |
| 7,508,092 B2 | 3/2009 | Menas et al. | |
| 7,514,814 B2 | 4/2009 | Menas et al. | |
| 7,573,159 B1 | 8/2009 | DeIuliis et al. | |
| 7,579,711 B2 | 8/2009 | Menas et al. | |
| 7,602,079 B2 | 10/2009 | Menas et al. | |
| 7,646,107 B2 | 1/2010 | Smith | |
| 7,646,111 B2 | 1/2010 | Menas et al. | |
| 7,701,168 B2 | 4/2010 | Thijssen | |
| 7,766,698 B1 | 8/2010 | De Iuliis et al. | |
| 7,768,152 B2 | 8/2010 | Menas et al. | |
| 7,791,220 B2 | 9/2010 | Menas et al. | |
| 7,808,122 B2 | 10/2010 | Menas et al. | |
| 7,812,475 B2 | 10/2010 | Menas et al. | |
| 7,812,476 B2 | 10/2010 | Menas et al. | |
| 7,812,477 B2 | 10/2010 | Menas et al. | |
| 7,812,478 B1 | 10/2010 | Menas | |
| 7,816,807 B2 | 10/2010 | Menas et al. | |
| 7,816,808 B2 | 10/2010 | Menas et al. | |
| 7,816,809 B2 | 10/2010 | Menas et al. | |
| 7,816,810 B2 | 10/2010 | Menas et al. | |
| 7,886,104 B2 | 2/2011 | Lai et al. | |
| RE42,385 E | 5/2011 | Wong et al. | |
| 7,960,859 B2 | 6/2011 | Menas et al. | |
| 7,978,489 B1 | 7/2011 | Telefus et al. | |
| 8,219,729 B1 | 7/2012 | Wright | |
| 8,222,773 B2 | 7/2012 | De Iuliis et al. | |
| 8,237,414 B1 | 8/2012 | Li et al. | |
| 8,350,522 B2 | 1/2013 | Johnson | |
| 8,760,123 B2 | 6/2014 | Hawawini et al. | |
| 8,773,078 B2 | 7/2014 | Yu et al. | |
| 8,819,301 B2 * | 8/2014 | Lai | H02J 7/0004 710/10 |
| 2004/0251878 A1 * | 12/2004 | Veselic | H02J 7/00 320/141 |
| 2007/0035276 A1 * | 2/2007 | Webjorn | H02J 7/0052 320/114 |
| 2008/0012423 A1 * | 1/2008 | Mimran | H01R 25/003 307/11 |
| 2008/0042616 A1 * | 2/2008 | Monks | H04L 12/10 320/106 |
| 2008/0073117 A1 | 3/2008 | Misener | |
| 2008/0265838 A1 * | 10/2008 | Garg | G06F 1/266 320/115 |
| 2009/0177906 A1 | 7/2009 | Paniagua, Jr. et al. | |
| 2010/0033018 A1 * | 2/2010 | Fukasawa | H02J 7/0036 307/80 |
| 2010/0090644 A1 * | 4/2010 | Nokkonen | G06F 1/26 320/107 |
| 2010/0237696 A1 | 9/2010 | Maleyran et al. | |
| 2010/0280671 A1 | 11/2010 | Lee | |
| 2011/0035624 A1 | 2/2011 | Miller | |
| 2011/0095722 A1 | 4/2011 | Chang | |
| 2012/0166173 A1 | 6/2012 | Fischbach | |
| 2012/0276763 A1 | 11/2012 | Quezada | |
| 2012/0292991 A1 * | 11/2012 | Dodal | H02H 3/16 307/11 |
| 2013/0241469 A1 * | 9/2013 | Ono | H02J 7/0042 320/107 |
| 2014/0333263 A1 * | 11/2014 | Stewart | H02J 7/0042 320/111 |
| 2015/0038006 A1 * | 2/2015 | Jansen | H02J 7/0021 439/535 |

* cited by examiner

MULTIPORT USB CHARGER

CROSS-REFERENCE TO RELATED APPLICATION

The present application claims the benefit of and priority to U.S. Provisional Application Ser. No. 61/860,646 filed on Jul. 31, 2013, the entire contents of which are incorporated herein by reference.

BACKGROUND

Technical Field

The present disclosure relates to a multiport Universal Serial Bus (USB) charger. More particularly, the present disclosure relates to a multiport USB charger configured to limit charging current to devices attached to the multiport USB charger when the device's charging current request exceeds the charging current capabilities of the multiport USB charger.

Description of Related Art

Due to proliferation of various rechargeable consumer electronic devices, such as cell phones, laptops, tablets, personal digital assistants (PDA's), and the like, there is a need to charge and/or connect to such devices. Most of these devices are powered by low voltage and recharging these devices may be facilitated through the use of standard interfaces such as a Universal Serial Bus (USB) charging device. Such charging devices may be designed to charge multiple electronic devices simultaneously.

However, when multiple devices are coupled to the USB charging device, the charging current requested by each of the electronic devices may exceed an output charging current capacity of the USB charging device. Conventional USB charging devices remedy this situation by limiting current flow to a channel that supplies the charging current to the USB port that the electronic device(s) is/are attached. Limiting charging current in this manner, however, can lead to the USB charging device overheating, which, in turn, can lead to channel shut down and/or the USB charging device not functioning as intended.

SUMMARY

As can be appreciated, a multiport USB charger configured to limit charging current to a device attached to the multiport USB charger when the device's charging current request exceeds the charging current capabilities of the multiport USB charger may prove useful in the related arts.

Embodiments of the present disclosure are described in detail with reference to the drawing figures wherein like reference numerals identify similar or identical elements.

An aspect of the present disclosure provides a universal serial bus (USB) charging device that includes a microprocessor, a power supply configured to output a total charging current, and a plurality of low voltage ports in communication with the microprocessor and electrically coupled to the power supply, each of the plurality of low voltage ports being capable of connecting with the electronic devices and providing the electronic devices a device charging current. The microprocessor is configured to enumerate the connected electronic devices and communicate to each of the enumerated electronic devices the device charging current available through its respective low voltage port connection. The available device charging current for each enumerated electronic device is determined by the microprocessor as a function of the total charging current and the enumerated electronic devices.

In another aspect of the present disclosure, as one or more of the electronic devices are connected/disconnected from the plurality of low voltage ports, the microprocessor is configured to re-enumerate the connected electronic devices and communicate to each of the re-enumerated electronic devices a redetermined device charging current available through its respective low voltage port connection.

In yet another aspect of the present disclosure, the available redetermined device charging current for each re-enumerated electronic device is determined by the microprocessor as a function of the total charging current and the re-enumerated electronic devices.

In yet another aspect of the present disclosure, the microprocessor is configured to continuously re-enumerate and redetermine as one or more of the electronic devices are connected/disconnected to/from the plurality of low voltage ports.

In yet another aspect of the present disclosure, the plurality of low voltage ports include a microchip which is connected to a resistive voltage divider network. The resistive voltage divider network includes a first resistive branch including at least one resistor and a second resistive branch including at least three resistors.

Logic circuitry associated with the first resistive branch is configured to ensure that the current does not exceed a maximum current threshold. Logic circuitry associated with the second resistive branch is configured to ensure that the current does not fall below a minimum current threshold.

In yet another aspect of the present disclosure, the microprocessor is programmed to measure voltage of the power supply of the universal serial bus charging device such that if a voltage output of the power supply falls below a nominal value, the microprocessor either disconnects one or more of the plurality of low voltage ports or switches to a disconnect mode.

Another aspect of the present disclosure provides a multiport universal serial bus charging device. The multiport universal serial bus charging device includes a microprocessor, a power supply configured to output a total charging current, and a plurality of low voltage ports each in communication with the microprocessor and electrically coupled to the power supply. The microprocessor is configured to enumerate the connected electronic devices and communicate to each of the enumerated electronic devices, the device charging current available through its respective low voltage port connection.

Each respective resistive voltage divider network may include a first resistive branch including at least one resistor and a second resistive branch including at least three resistors. The at least one output signal is indicative of a current measured along the second resistive branch of the respective voltage divider network.

Logic circuitry associated with the first resistive branch of the respective voltage divider networks may be configured to ensure that current does not exceed a maximum threshold. Similarly, logic circuitry associated with the second resistive branch of the respective voltage divider networks may be configured to ensure that current does not fall below a minimum threshold.

The multiport universal serial port charging device may include a power supply configured to provide ten (10) watts of power and two (2) amps of charging current. In this instance, the plurality of low voltage ports may include first and second low voltage ports. Each of the first and second low voltage ports may be capable of providing one (1) amp of charging current to electronic devices attached thereto.

The multiport universal serial port charging device may include a power supply configured to provide twenty (20) watts of power and four (4) amps of charging current. In this instance, the plurality of low voltage ports may include first, second, third, and fourth low voltage ports. Each of the first, second, third, and fourth low voltage ports may be capable of providing one (1) amp of charging current to electronic devices attached thereto.

The microprocessor may be programmed to measure voltage of a power supply of the multiport universal serial bus charging device such that if a voltage output of the power supply falls below a nominal value, the microprocessor either disconnects one of the plurality of low voltage ports or switches to a disconnect mode.

Another aspect of the present disclosure provides a method for charging multiple portable devices attached to a multiport universal serial bus charging device. A charging current draw from the multiple portable devices attached to the multiport universal serial bus charging device is compared with a maximum charging current capacity of the multiport universal serial bus charging device. If the combined charging current draw from the multiple portable devices is greater than the maximum charging current capacity of the multiport universal serial bus charging device, the charging current draw of at least one of the portable devices is renegotiated so that the combined charging current draw from the multiple portable devices does not exceed the maximum charging current capacity of the multiport universal serial bus charging device.

BRIEF DESCRIPTION OF THE DRAWING

Various embodiments of the present disclosure are described herein below with references to the drawings, wherein.

DETAILED DESCRIPTION

Detailed embodiments of the present disclosure are disclosed herein; however, the disclosed embodiments are merely examples of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

As described above, a multiport USB charger configured to limit charging current to a device attached to the multiport USB charger when the device's charging current request exceeds the charging current capabilities of the multiport USB charger may prove useful in the related arts, and such a multiport USB charger is described herein.

Figure 1:
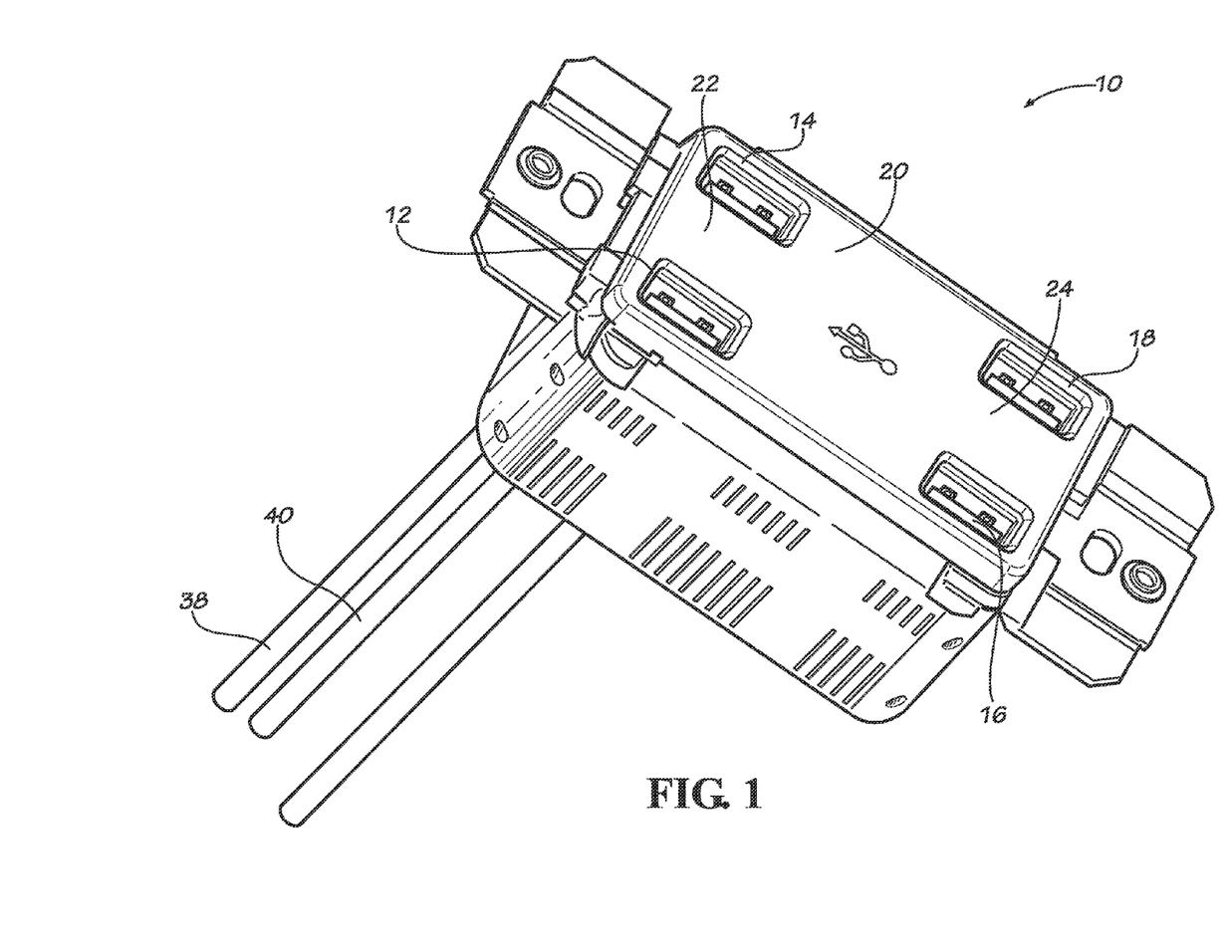
FIG. 1 is a perspective view of a multiport Universal Serial Bus (USB) charger according to an embodiment of the present disclosure.

FIG. 1 illustrates a multiport USB charging device 10 that includes four vertically oriented low voltage port apertures (e.g., USB charging ports) 12, 14, 16, and 18. Wiring device 10 includes a generally rectangular face 20 and the area of face 20 includes a longitudinal axis α and a lateral axis β. Longitudinal axis α bisects the area of face 20 parallel to the long dimension of the face dividing the face into right and left regions. Lateral axis β bisects the area of the face 20 parallel to the short dimension of the face, dividing the face into top and bottom regions. Lateral axis β is at a right angle to longitudinal axis α.

Face 20 includes a first region 22 (e.g., a top half) and a second region 24 (e.g., a bottom half) located on opposite sides of lateral axis β. First region 22 of face 20 includes the first and second low voltage port apertures 12 and 14. First low voltage port aperture 12 is elongated along an axis which is parallel to longitudinal axis α. Second low voltage port aperture 14 is also elongated along an axis which is parallel to longitudinal axis α. Both first and second low voltage port ports 12 and 14 are offset from longitudinal axis α. Offsetting first and second low voltage port apertures 12 and 14 from longitudinal axis α results in a neater and more attractive appearance. Likewise, second region 24 located on face 20 and includes the third and fourth low voltage port apertures 16 and 18, each of which is similarly offset from, and elongated along a respective axis parallel to, longitudinal axis α.

Figure 2:
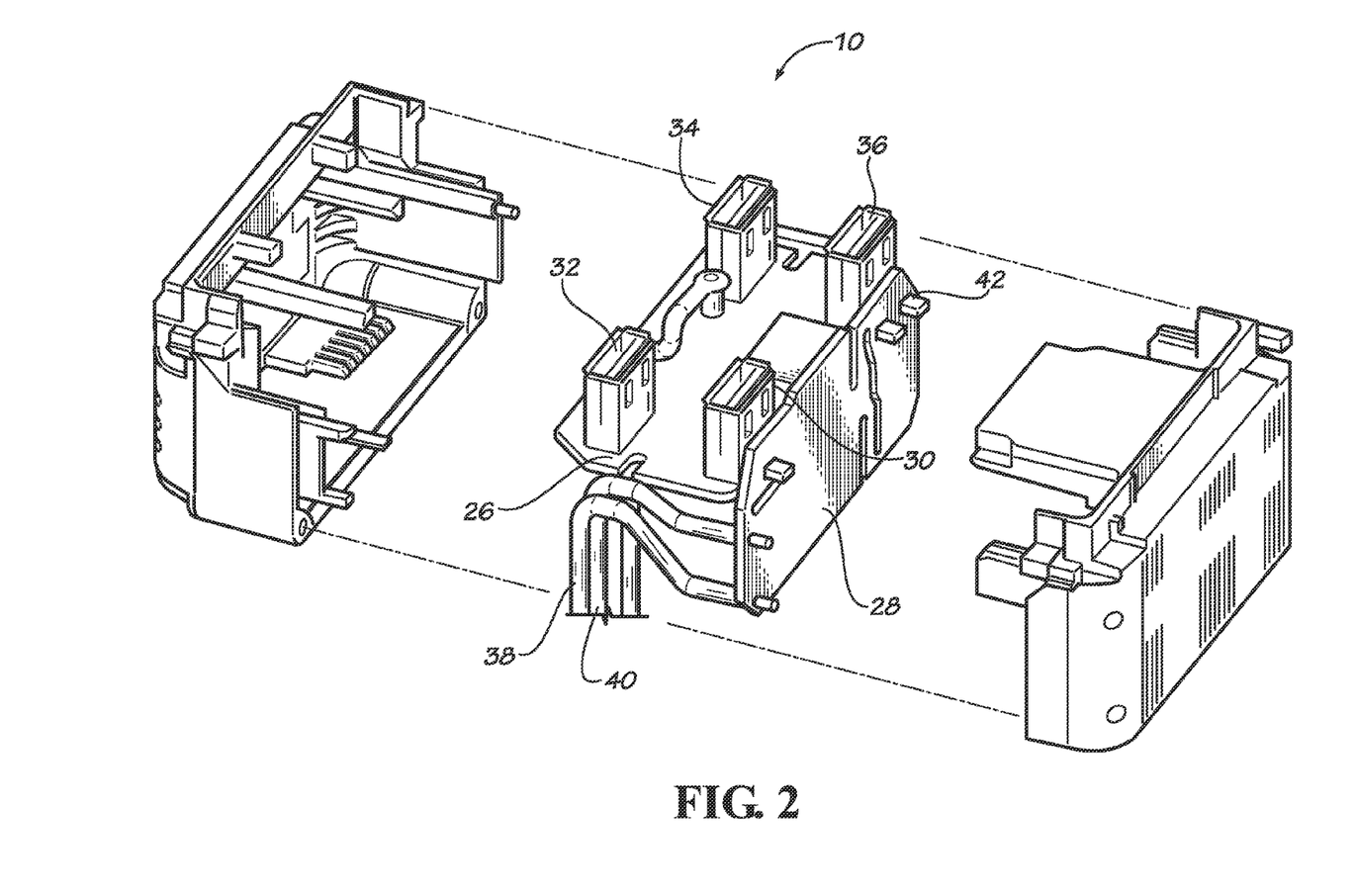
FIG. 2 is an exploded view of the multiport USB charger shown in FIG. 1 with a face structure and a strap removed to illustrate a logic printed circuit board (PCB) and a power PCB of the multiport USB charger.

Referring to FIG. 2, the multiport USB charging device 10 includes first and second printed circuit boards (PCBs) 26 and 28. First PCB 26 is a logic PCB and second PCB 28 is a power PCB. First PCB 26 includes at least one low voltage port. In the illustrated embodiment, the first PCB 26 is shown including first, second, third, and fourth low voltage ports 30, 32, 34, 36, which align with respective low voltage port apertures 12, 14, 16, and 18. In the illustrated embodiment, the low voltage ports 30, 32, 34, 36 are USB charging ports, which can be configured as dedicated charging ports (DCPs), charging downstream ports (CDPs), and/or standard downstream ports (SDPs). However, low voltage ports 30, 32, 34, and 36, can be of any suitable type or combination of types. Second PCB 28 preferably is a power PCB and receives line voltage from conductors 38 and 40 (e.g. Phase and Neutral). The conductors 38 and 40 can be connected directly to a power line, such as, for example, if the multiport USB charging device 10 is to be wall mounted. Alternatively, the conductors 38 and 40 can have a standard plug configuration for connection with a standard wall receptacle.

First and second PCBs 26 and 28 are joined together at a right angle therebetween, without intervening material. The first and second PCBs 26 and 28 can be joined by any suitable method including but not limited to soldering, adhesive, etc. Joining the PCBs 26 and 28 in this manner makes for efficient use of the volume within the housing, simplified manufacture, and reduced cost. Alternatively, first and second PCBs 26 and 28 can be electrically connected together through any suitable medium such as, but not limited, to PCB connector(s), wires, bus bars, or any combination thereof. Alternatively, in another exemplary embodiment, all components may be mounted on a single PCB. To facilitate the electrical and/or mechanical connection of first and second PCBs 26 and 28, the first PCB 26 includes PCB tabs 42, which are received by PCB connection apertures (not shown in detail) on second PCB 28.

The multiport USB charging device 10 includes circuitry 48 (FIG. 3) used to transform line voltage from an external source (e.g., an outlet not shown) to low voltage. This circuitry 48 may reside on the first PCB 26 and/or second PCB 28. Alternatively, the line to low voltage transformation circuitry may reside at any other suitable location. The circuitry 48 receives power from the external source and distributes power to the components of the multiport USB charging device 10. In embodiments, the multiport USB charging device 10 is configured to operate using nominal DC power, e.g., about 5V, which is provided to the multiport USB charging device 10 by the external source. In embodiments, the multiport USB charging device 10 is compliant with the requirement of USB 2.0, which specifies that the output voltage should be between 4.75 and 5.25 V DC.

Figure 3:
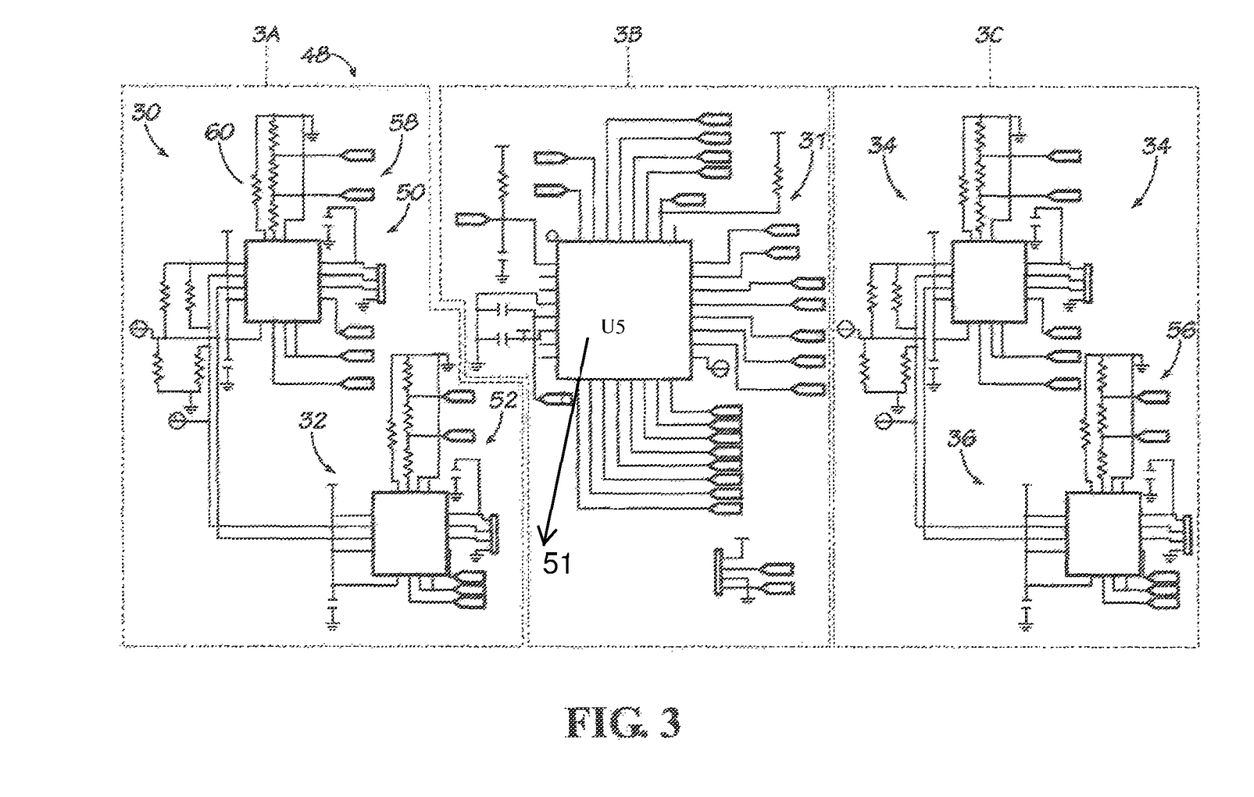
FIG. 3 is a wiring diagram of the circuitry of the multiport USB charger shown in FIG. 1.
Figure 3A:
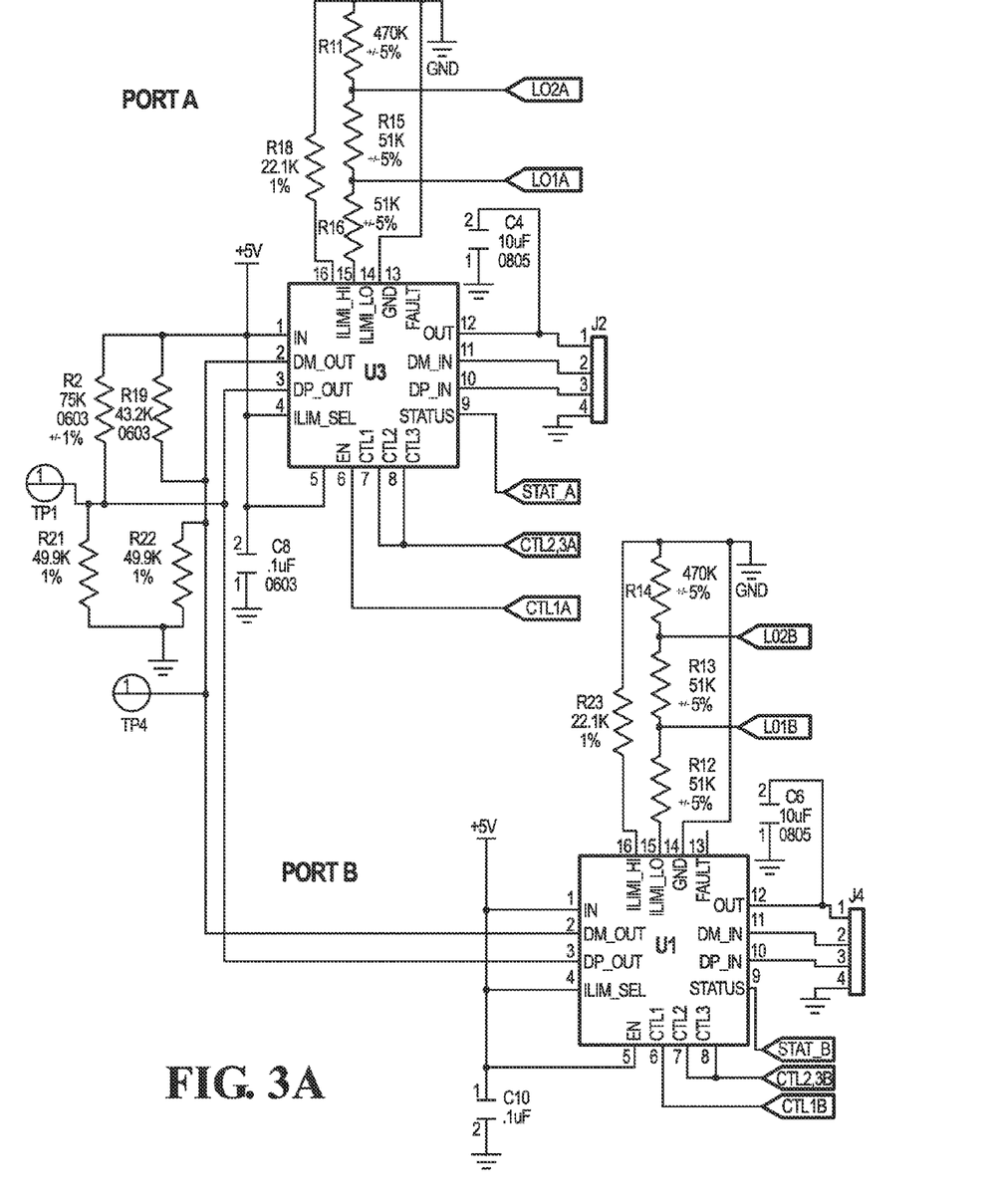
FIG. 3A shows in greater detail the circuitry identified by "3A' in FIG. 3.
Figure 3B:
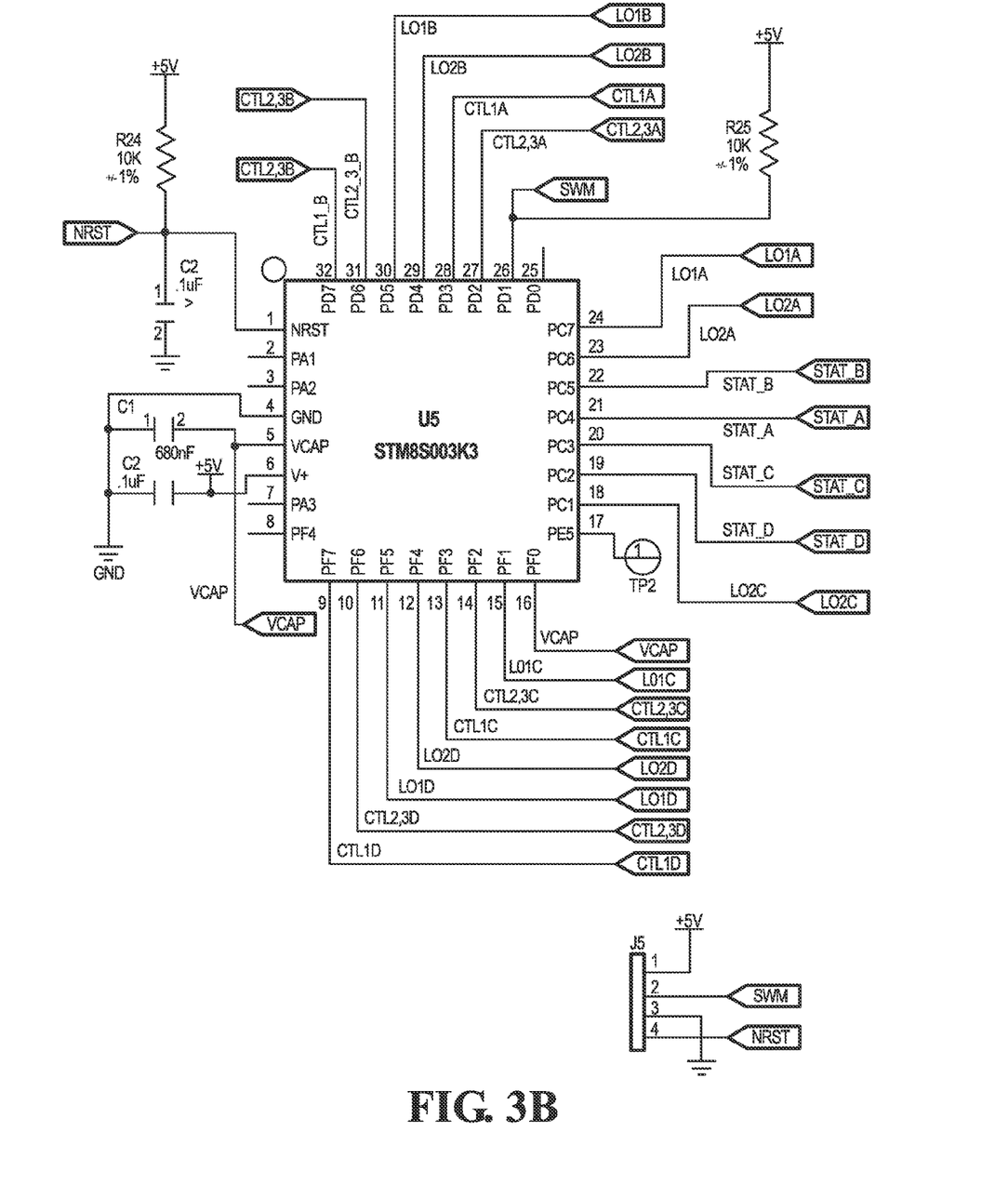
FIG. 3B shows in greater detail the circuitry identified by "3B" in FIG. 3.
Figure 3C:
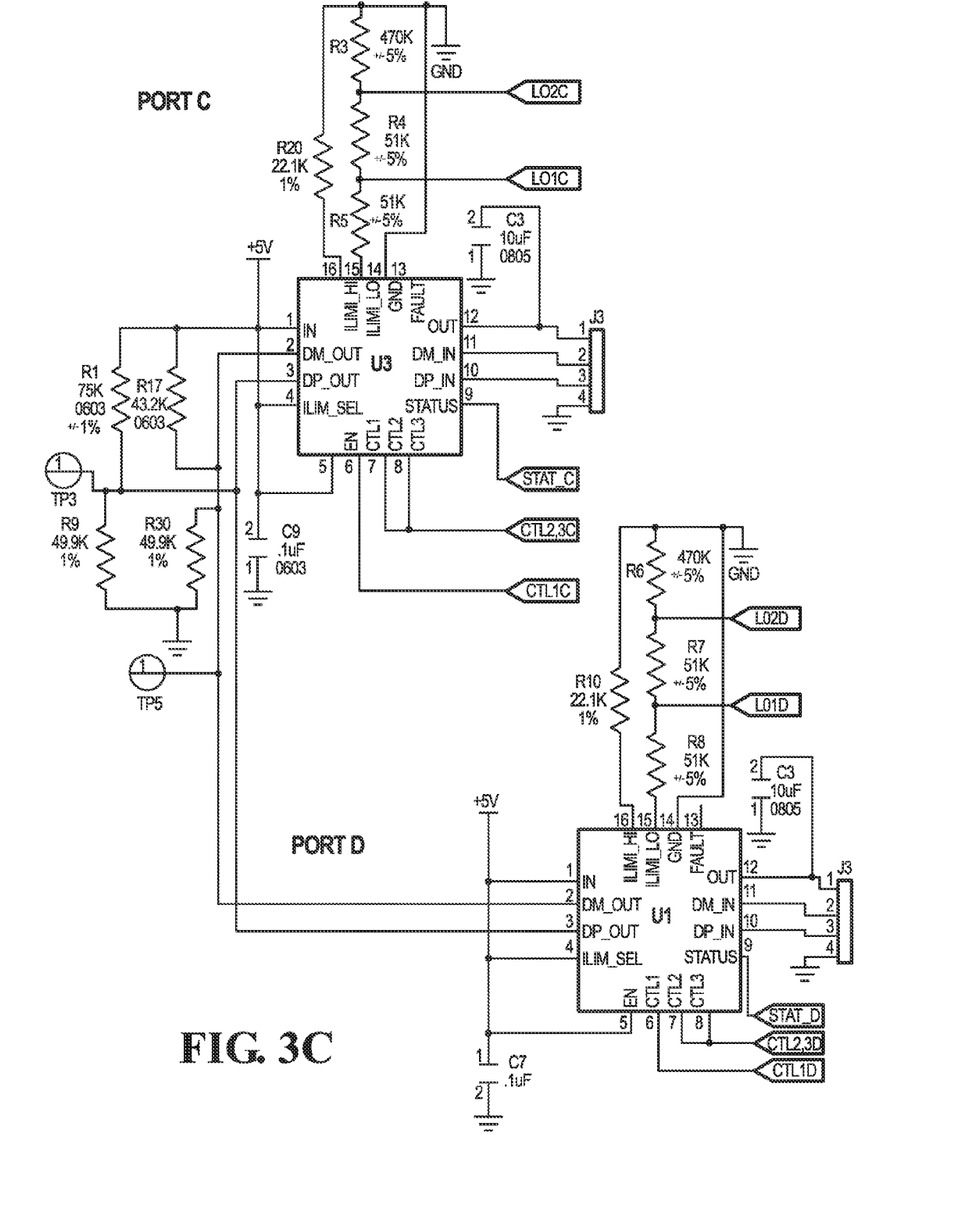
FIG. 3C shows in greater detail the circuitry identified by "3C" in FIG. 3.
Figure 4:
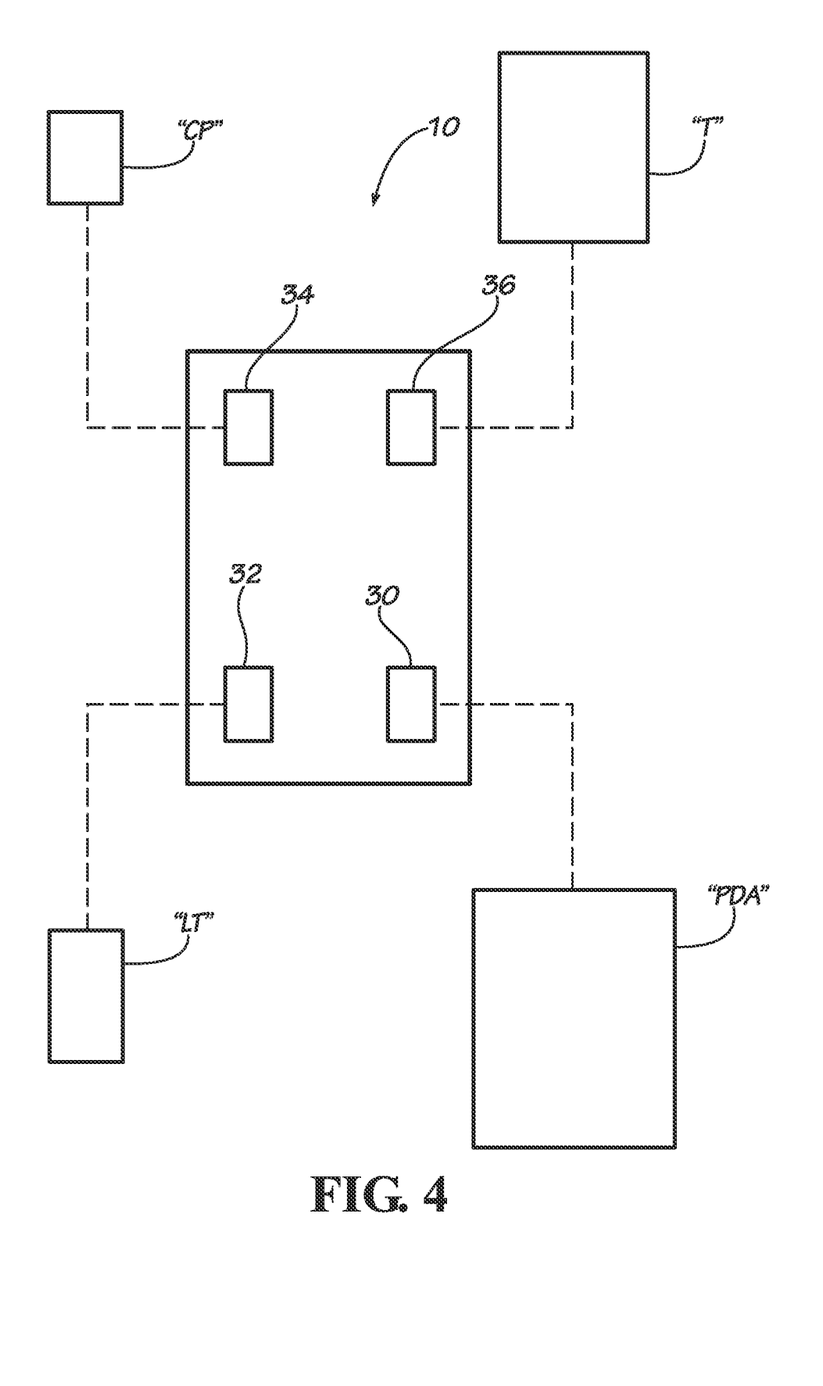
FIG. 4 is a block diagram of the multiport USB charger shown in FIG. 1 and various portable devices that may be attached to the multiport USB charger.

Referring to FIG. 3, the circuitry 48 is illustrated. The circuitry 48 is configured to charge various rechargeable consumer electronic devices (see FIG. 4 for example), e.g., portable devices such as cell phones "CPs", laptops "LTs", tablets "Ts", personal digital assistants ("PDAs"), etc.

In accordance with the present disclosure, the circuitry 48 is configured to limit power requested by the portable device, e.g., tablets "T", not by limiting current within the multiport USB charging device 10, which eventually increases temperature and causes channels to shut down, but by re-negotiating power demand of the portable device. With this purpose in mind, each of the low voltage ports 30, 32, 34, and 36 includes a resistive voltage divider network that is connected to a microchip associated with each of the low voltage ports 30, 32, 34, and 36, which enables a microprocessor 51 (e.g., microchip U5) of the multiport USB charging device 10 to measure a current range (e.g., not charging; less than 0.5 a; within a range from about 0.5 a-1 a; and greater than 1 a) of the low voltage ports 30, 32, 34, and 36.

Continuing with reference to FIG. 3, each of the low voltage ports 30, 32, 34, and 36 includes respective circuits 50, 52, 54, and 56, which communicate various signals to the microprocessor 51. Because the respective circuits 50, 52, 54, and 56 are identical to one another, and so as not to obscure the present disclosure with unnecessary detail, only the circuit 50 of the low voltage port 30 is described herein in detail.

Circuit 50 includes a resistive voltage divider network 58 which includes a first resistive branch 60 including a resistor R18 having an ohm rating of about 22.1K. The first resistive branch 60 is electrically connected to a pin 16 of a microchip U2 of the circuit 50 and to ground GND.

Circuit 50 also includes a second resistive branch 62. The second resistive branch 62 includes resistors R15, R16 each having an ohm rating of about 51K and a resistor R11 having an ohm rating of about 470K. The resistors R15, R16, and R11 are connected in series with one another. The second resistive branch 62 is electrically connected to a pin 15 of the microchip U2 and to GND.

Resistors connected to pins 15 and 16 are used to set the high and low current limits, namely, ILIMI_LO and ILIMI_HI. No current value is directly measured on these pins. The current is measured indirectly by changing the resistor value of the divider connected to pin 15 and reading the value of the STATUS pin. The value of the STATUS pin is the result of comparison of the real charging current and the set ILIMI_LO. If the charging current is higher than the ILIMI_LO threshold, its output is LOW, and when the load current is lower than the limit, the output is HIGH.

When a portable device is attached to the low voltage port 30, a voltage measurement is taken across resistor R11 to GND and a signal LO2A is communicated to pin 23 of the microprocessor 51. Simultaneously, a voltage measurement is also taken across R15 to GND and a signal LO1A is communicated to pin 24 of the microprocessor 51, which then utilizes signals LO1A, LO2A to determine if a current is within a predetermined threshold value.

LO2A and LO1A are outputs from the microprocessor 51. The microprocessor 51 keeps them in a high impedance state (e.g., pull LO2A to the GND or LO1A to the GND). This configuration changes the resistor value, which defines a threshold for a current comparator. Based on this threshold, the chip generates an output on the STAT_A line. Each resistor value matches one of the current levels through the chip. Thus, by manipulating LO1A and LO2A, the microprocessor 51 can range the current going through the chip and then decide what mode is set for the chip in order to control the current.

Status pin 9 of the microchip U2 is electrically connected to the microprocessor 51 and logic circuitry associated with the pin 9 generates a status signal STAT_A that is communicated from the status pin 9 to a pin 21 of the microprocessor 51. The status signal STAT_A is communicated to the microprocessor 51 when a portable device is initially attached to and requesting charging current from the low voltage port 30. In embodiments, the microprocessor 51 receives input from each iteration of the circuit 50 to enable the microprocessor 51 to obtain a charge status of portable device attached to the low voltage port 30.

A receptacle, e.g., junction J2, of the low voltage port 30 attaches to a plug of a portable device and includes a four (4) pin configuration. In embodiments, the junction J2 may be configured as a µ-B or a µ-AB receptacle. Pin 1 of the junction J2 connects to OUT pin 12 (e.g., VBUS) of the microchip U2 and is one of the power pins of the low voltage port 30. Pin 4 of the junction J2 is the other power pin and connects to GND. Pins 2 and 3 connect to DM_IN (e.g., D−) and DP_IN (e.g., D+) pins 11 and 10, respectively. DM_IN pin 10 and DP_IN pin 11 are differential data pins (data pins) often referred to as D+ and D−, which are used when communication and data transfer (e.g., communications) takes place between the multiport USB charging device 10 and an attached portable device.

The DM_IN pin 10 and DP_IN pin 11 data pins are configured to allow a handshake to occur when a portable device is attached to the low voltage port 30. In accordance with the instant disclosure, this handshake can include the microprocessor 51 communicating with the attached portable device to enable the portable device itself to determine how much current to draw from the maximum current available, as will be described in detail below. In embodiments according to the present disclosure, the microprocessor 51 informs the portable device of the maximum amount of current it can draw and permits the portable device itself to either draw the maximum amount of current or draw an amount less than the maximum amount of current. This allows the portable device to self-regulate how much current to draw based on the maximum current available. In other words, the microprocessor 51 does not control the amount of power available to each portable device and does not actively regulate the flow of current. How much current each portable device can draw is determined by the portable device itself based on the maximum current available. The maximum current is computed by the microprocessor 51.

Control signal CTL 2,3A is output from CTL2 pin 7 and CTL3 pin 8 of the microchip U2 to PD2 pin 27 of the microprocessor 51. Similarly, control signal CTL1A is output from CTL 1 pin 6 of the microchip U2 to PD3 pin 28 of the microprocessor 51. The control signals CTL 2,3A and CTL1A switch the chip to one of modes DCP, CDP or discharge, and in each mode negotiation with the attached device, yield different charging current.

The other components of the circuit 50 are standard components in USB ports, and a detailed description of how these components operate has not been provided as their configuration and operation would be known to persons of ordinary skill in the art.

However, when in AUTO DCP mode, the chip attempts to provide a maximum current, and may request 1.5-2.0 A by using internal switches and resistors. In a case where the charging device can't have more than 1 A, the microprocessor 51 then switches U3 to the CDP mode, and in this mode, internal resistors are not connected. Instead, DM_IN is connected to DM_OUT and DP_IN is connected to DO_OUT. Thus, the D+/D1 bus is attached to the external divider R2, R19, R21, R22. The value of such resistors is selected so as to communicate to the attached device that more than 1 A current is not permissible.

R18 set overcurrent protection at about 2.4 A to prevent chip from thermal damage.

The circuits 52, 54, and 56 include respective resistive voltage divider networks and microchips including pin configurations that are, other than nomenclature, identical to the resistive voltage divider network 58 and microchip U2. Accordingly, the resistive voltage divider networks and microchips associated with the circuits 52, 54, and 56 are not described in detail. As can be appreciated, the microprocessor 51 communicates with the circuits 52, 54, and 56 in a manner as described above with respect to the circuit 50.

The microprocessor 51 is configured to enumerate the connected electronic devices and communicate to each of the enumerated electronic devices the device charging current available through its respective low voltage port connection. Thus, the microprocessor 51 informs the connected electronic devices of a maximum amount of current available, but allows the connected electronic devices to determine an amount of current to draw from the low voltage ports 30, 32, 34, and 36. In embodiments, the enumerated electronic devices themselves initiate distribution of the low charging current from the low voltage ports 30, 32, 34, 36. This prevents constant cycling, which can be caused by a possible "wake up" when the portable device is switched to discharge mode, between the low voltage ports 30, 32, 34, and 36. This initial detection is achieved by sensing current (e.g., current through one of the first and second resistive branches 60, 62 of the resistive circuit 58) from the low voltage port 30. Therefore, the microprocessor 51 does not regulate or control the flow of current to the enumerated electronic devices. Instead, the enumerated electronic devices themselves decide on how much current to draw from the maximum current available (indicated or computed by the microprocessor 51). In other words, the enumerated electronic devices are self-regulated. The microprocessor 51 is configured to continuously re-enumerate and redetermine as one or more of the electronic devices or portable devices are connected/disconnected to/from the plurality of voltage ports 30, 32, 34, 36.

USB standard 2.0 provides for the low voltage output ports 30, 32, 34, and 36 to provide power to attached portable devices at a nominal value. In embodiments, the multiport USB charging device 10 may provide up to 10 W of power. Thus, in this embodiment, each of the low voltage ports 30, 32, 34, 36 is capable of providing up to two (2) amps of charging current, that is 10 W/5V=2 A. This 2 A of charging current may be distributed evenly among the four (4) low voltage ports 30, 32, 34, and 36 to provide up to 500 mA to four (4) portable devices attached to the low voltage ports 30, 32, 34, and 36.

In embodiments, such as, for example, when the multiport USB charging device 10 is configured to provide up to 20 W of power, each of the low voltage ports 30, 32, 34, and 36 is capable of providing 1.0 A of charging current to four (4) portable devices attached to the low voltage ports 30, 32, 34, 36. As can be appreciated, the amount of charging current that can be provided by the low voltage ports 30, 32, 34, 36 can be altered to accommodate other power requirements and/or charging current protocols.

In embodiments, such as the illustrated embodiment, the microprocessor 51 may be configured to provide power supply protection to ensure that the power supply does not fall below the nominal limit. When this occurs, it is considered an overload condition. In this particular embodiment, a junction J5 (FIG. 3) is provided and includes a pin 1 that is electrically connected to the 5V power supply and pin 3 that is electrically connected to GND. A pin 2 of the junction 5 is electrically connected to a PD1 pin 26 of the microprocessor 51 and a pin 4 of the junction 5 is electrically connected to NRST pin 1 of the microprocessor 51. Logic circuitry associated with the pin 2 generates a SWM signal that is output to PD1 pin 26 of the microprocessor 51 and logic circuitry associated with the pin 4 generates a NRST signal that is output to the NRST pin 1 of the microprocessor 51. When the microprocessor 51 detects the SWM signal and NRST signal, the microprocessor 51 switches to a disconnect mode that disables the low voltage ports 30, 32, 34, 36.

In other words, pin 1 is a reset pin for this particular microcontroller. To measure voltage in this particular exemplary embodiment, the input of the AD converter (pin 16) is connected to pin 5, which is the output of the internal 1.8V linear regulator inside the chip. All AD converter readings are referenced to the input V+, which is the common power supply output. However, VCAP is stable because of internal regulations. When a, e.g., 5V power supply goes down, the reading of the VCAP goes up, and this can be used to measure the input in reference to the stable VCAP voltage. Moreover, it is noted that pin 26 is used to monitor the output level and shuts down the device when an overvoltage condition is detected.

Operation of the multiport USB charging device 10 is now described. For purposes of this description, the multiport USB charging device 10 is assumed to include a 20 W power supply that provides up to 4 A of charging current.

The multiport USB charging device 10 may be used to charge one or multiple portable devices. For example, in embodiments, the multiport USB charging device 10 may be used to simultaneously charge four (4) portable devices (e.g., four (4) tablets "T") attached to the multiport USB charging device 10.

Initially, a first tablet "T" may be attached to one of the low voltage ports, e.g., low voltage port 30. For illustrative purposes, the first tablet "T" is defaulted to request 2 A of charging current when attached to the multiport USB charging device 10. Upon detection of the first tablet "T" being attached to the low voltage port 30, the microprocessor 51 allows the first tablet "T" to draw the requested 2 A of charging current from the low voltage port 30, as this charging current is within the charging current capacity of the multiport USB charging device 10. It is noted that the first tablet "T" may draw the maximum current, as determined by the microprocessor 51, or may draw a current less than the maximum current. Thus, the first tablet "T" itself may determine how much current to draw and need not necessarily draw the maximum amount of current available as indicated by the microprocessor 51.

Thereafter, a second tablet "T" may be attached to one of the other low voltage ports, e.g., low voltage port 32. Again, the microprocessor 51 allows the second tablet "T" to draw the requested 2 A of charging current from the low voltage port 32, as the combined charging current request of the two (2) tablets "T" is within the charging current capacity of the multiport USB charging device 10, i.e., 4 A. Once again, the second tablet "T" may draw any amount of current it desires, up to the maximum current available, as computed by the microprocessor 51. Thus, the microprocessor 51 does not dictate the amount of current each tablet "T" should draw. Instead, each tablet "T" can make that determination for itself.

In the instance, where third and fourth tablets "T" are attached to the remaining low voltage ports, e.g., low voltage ports 34 and 36, each of the third and fourth tablets "T" will also request 2 A of charging current from the respective low voltage ports 36 and 38. The microprocessor 51, however, detects this request and communicates with the four tablets "T" via the data pins of the microchips associated with the low voltage ports 30, 32, 34, and 36 to renegotiate the charging current request of the four (4) tablets "T." Specifically, the microprocessor 51 communicates with the four (4) tablets "T" to change their initial current charging request from 2 A to 1 A, which is within the 4 A charging current capacity of the multiport USB charging device 10. Therefore, the microprocessor 51 indicates what the maximum amount of current is to each of the tablets "T," and based on this information, each tablet "T" decides on how much current to draw.

Once one of the four (4) tablets "T" is fully charged (or unattached from the multiport USB charging device 10), the microprocessor 51 re-communicates with the remaining attached tablets "T" and again renegotiates charging current requests with the remaining attached tablets "T". For example, if two (2) of the four (4) tablets "T" are unattached from the multiport USB charging device 10 and the two (2) remaining tablets "T" are still charging, the microprocessor 51 will allow each of the two (2) remaining attached tablets "T" to draw 2 A of charging current until the remaining tablets "T" are fully charged. Therefore, the microprocessor 51 is configured to continuously re-enumerate and redetermine as one or more of the electronic devices or portable devices are connected/disconnected to/from the plurality of voltage ports 30, 32, 34, 36.

As can be appreciated, the microprocessor 51 follows the same control protocol regardless of the number of portable devices that are attached to the multiport USB charging device 10 to ensure that the total current charging request of the attached portable device(s) does not exceed the maximum charging current capacity of the multiport USB charging device 10. However, it is noted that the charging current is dictated by the tablets' own self-regulation, which in turn is based on the amount of available current the microprocessor 51 has indicated as available.

The multiport USB charging device 10 overcomes the aforementioned drawbacks that are typically associated with conventional multiport USB charging devices. That is, because microprocessor 51 renegotiates charging current requests from an attached portable device as opposed to limiting current to the port attached to the portable device, the likelihood of one of the components of the multiport USB charging device 10 overheating is eliminated and, thus, the chances of the multiport USB charging device 10 shutting down during operation reduced.

The multiport USB charging device can also provide for intelligent current distribution, which can speed up and optimize the charging process. Examples of such features would be keeping the last connected port as a high priority and trying to provide a highest possible output on this port, or increasing an output current on some of the connected devices after other devices complete their charging.

In summary, the microprocessor is configured to enumerate the connected electronic devices and communicate to each of the enumerated electronic devices the device charging current available through its respective low voltage port connection. Moreover, the available device charging current for each enumerated electronic device is determined by the microprocessor as a function of the total charging current and the enumerated electronic devices. As one or more of the electronic devices are connected/disconnected from the plurality of low voltage ports, the microprocessor is configured to re-enumerate the connected electronic devices and communicate to each of the re-enumerated electronic devices a redetermined device charging current available through its respective low voltage port connection. The available redetermined device charging current for each re-enumerated electronic device is determined by the microprocessor as a function of the total charging current and the re-enumerated electronic devices. As a result, the microprocessor is configured to continuously re-enumerate and redetermine as one or more of the electronic devices are connected/disconnected to/from the plurality of low voltage ports.

From the foregoing and with reference to the various figure drawings, those skilled in the art will appreciate that certain modifications can also be made to the present disclosure without departing from the scope of the same. For example, the multiport USB charging device 10 may be configured to provide a visual indication of the charge status (i.e. whether all portable devices are charged or whether one or more of the portable devices is/are still charging) via USB port state indicators (not shown). In embodiments, the port state indicators may include, for example, a colored (e.g., a yellow) Light Emitting Diode (LED) which is illuminated when one or more of the portable device connected to the multiport USB charging device 10 is not fully charged, and may include, for example, a green LED which is illuminated to indicate that all portable device connected to the multiport USB charging device 10 are fully charged.

In embodiments, when the multiport USB charging device 10 is connected to an external power source, a power indicator (not shown) may be illuminated to provide visual verification that the multiport USB charging device 10 is operational. The power indicator may be implemented using, for example, a blue LED or other visual indicator.

In embodiments, the multiport USB charging device 10 may be included as a component of an outlet configuration. Such an outlet configuration may include, for example, the multiport USB charging device 10, a receptacle (e.g., a GFI receptacle), a coaxial connection, a cat 5 connection, etc., or combination thereof.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A universal serial bus charging device for charging connected electronic devices, comprising:
   a microprocessor;
   a power supply configured to output a total charging current; and
   a plurality of low voltage ports in communication with the microprocessor and electrically coupled to the power supply, each of the plurality of low voltage ports being capable of connecting with the electronic devices and providing the electronic devices a device charging current,
   wherein the microprocessor is configured to enumerate the connected electronic devices and communicate to each of the enumerated electronic devices the device charging current available through its respective low voltage port connection,
   wherein the available device charging current for each enumerated electronic device is determined by the microprocessor as a function of the total charging current and the enumerated electronic device, and
   wherein each of the enumerated electronic devices self-regulates how much of the available device charging current to draw.

2. The universal serial bus charging device according to claim 1, wherein, as one or more of the electronic devices are connected/disconnected from the plurality of low voltage ports, the microprocessor is configured to re-enumerate the connected electronic devices and communicate to each of the re-enumerated electronic devices a redetermined device charging current available through its respective low voltage port connection.

3. The universal serial bus charging device according to claim 2, wherein the available redetermined device charging current for each re-enumerated electronic device is determined by the microprocessor as a function of the total charging current and the re-enumerated electronic devices.

4. The universal serial bus charging device according to claim 1, wherein the microprocessor is configured to continuously re-enumerate and redetermine as one or more of the electronic devices are connected/disconnected to/from the plurality of low voltage ports.

5. The universal serial bus charging device according to claim 1, wherein the plurality of low voltage ports include a microchip which is connected to a resistive voltage divider network.

6. The universal serial bus charging device according to claim 5, wherein the resistive voltage divider network includes a first resistive branch including at least one resistor and a second resistive branch including at least three resistors.

7. The universal serial bus charging device according to claim 6, wherein logic circuitry associated with the first resistive branch is configured to ensure that the current does not exceed a maximum current threshold.

8. The universal serial bus charging device according to claim 6, wherein logic circuitry associated with the second resistive branch is configured to ensure that the current does not fall below a minimum current threshold.

9. The universal serial bus charging device according to claim 1, wherein the microprocessor is programmed to measure voltage of the power supply of the universal serial bus charging device such that if a voltage output of the power supply falls below a nominal value, the microprocessor either disconnects one or more of the plurality of low voltage ports or switches to a disconnect mode.

10. A multiport universal serial bus charging device for charging connected electronic devices, comprising:
    a microprocessor;
    a power supply configured to output a total charging current; and
    a plurality of low voltage ports each in communication with the microprocessor and electrically coupled to the power supply,
    wherein the microprocessor is configured to enumerate the connected electronic devices and communicate to each of the enumerated electronic devices a device charging current available through its respective low voltage port connection, and
    wherein each of the enumerated electronic devices self-regulates how much of the available device charging current to draw.

11. The multiport universal serial bus charging device according to claim 10, wherein each of the low voltage ports of the plurality of low voltage ports includes a microchip connected to a respective resistive voltage divider network.

12. The multiport universal serial bus charging device according to claim 11, wherein the respective resistive voltage divider networks include a first resistive branch including at least one resistor and a second resistive branch including at least three resistors.

13. The multiport universal serial bus charging device according to claim 12, wherein the device charging current is a current measured along the second resistive branch of the respective voltage divider networks.

14. The multiport universal serial bus charging device according to claim 12, wherein logic circuitry associated with the first resistive branch of the respective voltage divider networks is configured to ensure that the current does not exceed a maximum threshold.

15. The multiport universal serial bus charging device according to claim 12, wherein logic circuitry associated with the second resistive branch of the respective voltage divider networks is configured to ensure that the current does not fall below a minimum threshold.

16. The multiport universal serial bus charging device according to claim 10, wherein the power supply is configured to provide ten (10) watts of power and two (2) amps of charging current.

17. The multiport universal serial bus charging device according to claim 10, wherein the plurality of low voltage ports includes first and second low voltage ports, each of the first and second low voltage ports capable of providing one (1) amp of charging current to electronic devices attached thereto.

18. The multiport universal serial bus charging device according to claim 10, wherein the power supply is configured to provide twenty (20) watts of power and four (4) amps of charging current.

19. The multiport universal serial bus charging device according to claim 18, wherein the plurality of low voltage ports includes first, second, third, and fourth low voltage ports, each of the first, second, third, and fourth low voltage ports capable of providing one (1) amp of charging current to electronic devices attached thereto.

20. The multiport universal serial bus charging device according to claim 10, wherein the microprocessor is programmed to measure voltage of the power supply of the multiport universal serial bus charging device such that if a voltage output of the power supply increases above the specified range the microprocessor either disconnects one of the plurality of low voltage ports or switches to a disconnect mode.

21. A method for charging multiple portable devices attached to a multiport universal serial bus charging device, the method comprising:

comparing a charging current draw from the multiple portable devices attached to the multiport universal serial bus charging device with a maximum charging current capacity of the multiport universal serial bus charging device; and if the combined charging current draw from the multiple portable devices is greater than the maximum charging current capacity of the multiport universal serial bus charging device, renegotiating the charging current draw of at least one of the portable devices so that the combined charging current draw from the multiple portable devices does not exceed the maximum charging current capacity of the multiport universal serial bus charging device, wherein each of the multiple portable devices self-regulates how much current to draw from the multiport universal serial bus charging device.

* * * * *